(12) United States Patent
Trinkel et al.

(10) Patent No.: US 7,411,604 B2
(45) Date of Patent: Aug. 12, 2008

(54) SYNCHRONIZATION OF A STEREOSCOPIC CAMERA

(75) Inventors: Marian Trinkel, Kreuzau OT Untermaubach (DE); Gerhard Bersick, Odenthal-Voiswinkel (DE)

(73) Assignee: Deutsche Telekom AG, Bonn (DE)

( * ) Notice: Subject to any disclaimer, the term of this patent is extended or adjusted under 35 U.S.C. 154(b) by 1058 days.

(21) Appl. No.: 10/129,400

(22) PCT Filed: Aug. 30, 2001

(86) PCT No.: PCT/EP01/09982

§ 371 (c)(1),
(2), (4) Date: Aug. 6, 2002

(87) PCT Pub. No.: WO02/21852

PCT Pub. Date: Mar. 14, 2002

(65) Prior Publication Data

US 2003/0052966 A1   Mar. 20, 2003

(30) Foreign Application Priority Data

Sep. 6, 2000 (DE) .................................. 100 44 032

(51) Int. Cl.
*H04N 13/02* (2006.01)

(52) U.S. Cl. .................... 348/47; 348/44; 348/522; 348/51; 348/521; 348/54; 348/46; 348/512; 382/154; 359/462; 359/466; 386/66; 386/40; 386/92

(58) Field of Classification Search ............ 348/47, 348/42, 208, 584, 500, 512, 521, 522, 51, 348/586, 572, 44, 54, 46; 473/198; 359/462, 359/466; 382/154, 151; 386/66, 40, 92
See application file for complete search history.

(56) References Cited

U.S. PATENT DOCUMENTS

| 4,966,436 | A | * | 10/1990 | Mayhew et al. | ............. 359/477 |
|---|---|---|---|---|---|
| 5,073,788 | A | * | 12/1991 | Lingwall | ................... 396/425 |
| 5,086,354 | A | * | 2/1992 | Bass et al. | ................ 359/465 |
| 5,589,942 | A | * | 12/1996 | Gordon | ..................... 356/611 |
| 5,886,747 | A | * | 3/1999 | Tzidon et al. | ............... 348/587 |
| 5,903,303 | A |   | 5/1999 | Fukushima et al. | ........... 348/47 |
| 6,163,336 | A | * | 12/2000 | Richards | ...................... 348/42 |

(Continued)

FOREIGN PATENT DOCUMENTS

DE          3751051          5/1988

(Continued)

OTHER PUBLICATIONS

R. Sand "New Aspects and Experiences in Stereoscopic Television", in SMPTE Journal, Nov. 1984, pp. 1052-1056.

(Continued)

*Primary Examiner*—Shawn An
(74) *Attorney, Agent, or Firm*—Darby & Darby

(57) ABSTRACT

A method for synchronizing the recordings of two video cameras which are operated in parallel for the three-dimensional representation of an image sequence includes fading a light signal into the image area of the two cameras and simultaneously recording the light signal by both cameras. Playback of the recordings are synchronized using the recorded signals. The two video cameras may be two digitally recording video recorders.

8 Claims, 1 Drawing Sheet

U.S. PATENT DOCUMENTS 6,335,765 B1 * 1/2002 Daly et al. .................. 348/586
6,592,465 B2 * 7/2003 Lutz et al. .............. 348/208.14

FOREIGN PATENT DOCUMENTS

| DE | 19544811 | | 8/1996 |
| --- | --- | --- | --- |
| EP | 0293480 | | 2/1995 |
| EP | 0734011 | | 9/1996 |
| JP | 01073891 | | 3/1989 |
| WO | WO 91/08439 | * | 6/1991 |
| WO | 9410604 | | 5/1994 |
| WO | WO 94/10604 | * | 11/1994 |
| WO | 9735439 | | 9/1997 |

OTHER PUBLICATIONS

S. Breide et al. "Speicherung und Uebertragung stereoskopischer Bewegtbilder" in Fernseh- und Kinotechnik, 53. jg., Nr. Nov. 1999, pp. 674-683.

German Search Report of application DE 100 44 032.0, German Patent Office Mar. 22, 2001 and brief translation thereof (5 pages).

* cited by examiner

SYNCHRONIZATION OF A STEREOSCOPIC CAMERA

BACKGROUND

The present invention relates to a method for synchronizing the recordings of two video cameras which are operated in parallel for the three-dimensional representation of an image sequence, in particular, of two digitally recording video recorders. The present invention likewise relates to a system for implementing this method.

In the domain of professional film and video recordings, cameras are known which permit parallel recording of image sequences via two equally oriented lenses. The synchronization of the cameras and of the projectors is carried out electronically, requiring a corresponding outlay. Due to the high financial outlay, these systems are not suitable for the private user, especially because the handling of the complex systems requires appropriate training.

SUMMARY OF THE INVENTION

It is an object of the present invention is to provide a method which permits high-precision synchronization of the recordings of two commercial video cameras using a simple and inexpensive device. It is also an object of the present invention to devise a system for implementing the method.

It is an important aspect of the present invention to bring a light signal into the field of view of the two cameras running in parallel and, optionally, to record an acoustic signal. The light signal and/or acoustic signal is simultaneously recorded by the cameras and can be used during playback for synchronizing the recordings. Via the light signal, sort of a "movie clapperboard" is implemented for the two cameras. In this context, it is unimportant whether one and the same light signal is recorded with both cameras or whether each camera records a separate light signal. However, it is required that two light signals occur at the same time, which is advantageously accomplished in the case of two light-emitting diodes via a common voltage supply. When the recordings are later mixed together, the light signals are used as marks for synchronizing the two films.

The advantages of the present invention lie in the possibility of simple and inexpensive implementation. Using the present invention, it is possible to use commercial video recorders to record three-dimensional films. In this connection, the synchronization is so precise that a high-quality 3-D representation results therefrom. By the present invention, 3-D recording becomes interesting to the mass market. When using digital cameras, playback is possible on conventional PC's and television sets. The present invention offers the user the experience of plastic vision. Thus, the 3-D effect is made possible without PC animation.

It is advantageous for the two cameras to be combined on a common mounting to form one system. The system according to the present invention is then provided with a device which make it possible for at least one light source to be positioned at least temporarily in the field of view of both cameras. Then, both cameras can be operated like a single one. It is inexpensive and therefore particularly advantageous to implement the device by way of a hinged holding device with which a light source is swung in front of both lenses or in each case one light source is swung in front of each of the two lenses simultaneously.

To simplify operation, it is also advantageous to couple the releases of both cameras mechanically or electronically. In a particularly advantageous embodiment, the light sources are switched on upon actuation of the common release. In this manner, it is guaranteed that when the two recordings are later cut together, they can be synchronized at the beginning of each film sequence. To be able to check the synchronization quality also within the running film sequence, it is advantageous that the light source be positioned in front of the lens or lenses and switched on in a cyclically repeated manner. In addition, it is advantageous to provide control electronics which allow the two light sources to be switched on simultaneously.

The light sources can be implemented particularly easily using light-emitting diodes. These are available in any desired size, luminosity, or color and, due to the low afterglow, are especially suitable for generating short-time light signals.

BRIEF DESCRIPTION OF THE DRAWING

In the following, the present invention will be explained in greater detail with reference to the drawing, in which:

FIG. 1 shows a schematic diagram of a system having two video cameras for parallel recording of the same image sequence.

Figure 4:
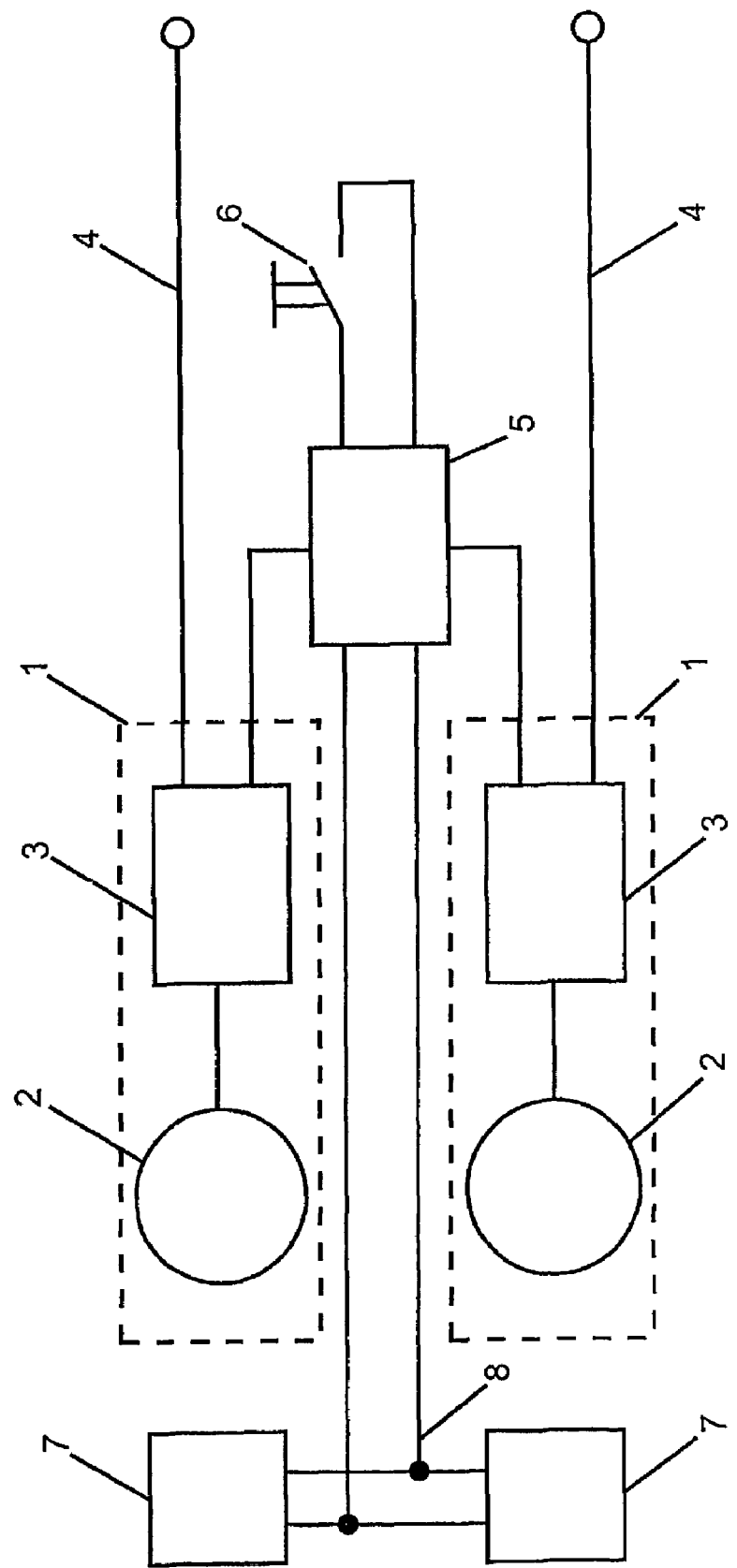

The FIGURE is a schematic view of two camcorders 1 of the classic type with their lenses 2 and their electronics 3.

Both are mounted on a common mounting which is not shown. The image sequences picked up by the camcorders can be tapped via signal lines 4. According to the present invention, both camcorders 1 are coupled via common control electronics 5 to which is connected a common release 6.

According to the present invention, provision is made for a device (not shown) which make it possible to temporarily swing in each case one light-emitting diode 7 in front of each of lenses 2. Light-emitting diodes 7 are synchronously excited also by control electronics 5 to which they are connected via lines 8.

What is claimed is:

1. A method for synchronizing respective image sequence recordings of two video cameras operated in parallel for three-dimensional representation of the image sequence, comprising:
   providing both cameras with at least one of a light and an acoustic signal;
   simultaneously recording by both cameras the at least one of a light and an acoustic signal; and
   providing the three-dimensional representation of the image sequence by synchronizing a playing back of the respective image sequence recordings using the recorded at least one of a light and an acoustic signal;
   wherein the providing both cameras with at least one of a light and an acoustic signal is performed by positioning a respective light source in front of a respective lens of each of the two video cameras and simultaneously switching on the respective light sources using a voltage supply.

2. The method as recited in claim 1 wherein the two video cameras include each include a respective digitally recording video recorder.

3. The method as recited in claim 1 further comprising mechanically or electronically coupling respective releases of the two video cameras.

4. A method for synchronizing respective image sequence recordings of two video cameras operated in parallel for three-dimensional representation of the image sequence, comprising:
   providing both cameras with at least one of a light and an acoustic signal;

simultaneously recording by both cameras the at least one of a light and an acoustic signal; and providing the three-dimensional representation of the image sequence by synchronizing a playing back of the respective image sequence recordings using the recorded at least one of a light and an acoustic signal;

wherein the providing both cameras with at least one of a light and an acoustic signal is performed by positioning a respective light source in front of a respective lens of each of the two video cameras and switching on the light sources for a short time upon actuation of a common release.

5. A method for synchronizing respective image sequence recordings of two video cameras operated in parallel for three-dimensional representation of the image sequence, comprising:

providing both cameras with at least one of a light and an acoustic signal;

simultaneously recording by both cameras the at least one of a light and an acoustic signal; and providing the three-dimensional representation of the image sequence by synchronizing a playing back of the respective image sequence recordings using the recorded at least one of a light and an acoustic signal;

wherein the providing both cameras with at least one of a light and an acoustic signal is performed by positioning a respective light source in front of a respective lens of each of the two video cameras and switching on the light sources in a cyclically repeated manner.

6. A system comprising:

two video cameras mounted on a common mounting for parallel recording of the same image sequence;

a positioning device configured for positioning at least one light source at least temporarily in a respective field of view of each of the two video cameras; and control electronics configured to enable two light sources of the at least one light source to be switched on simultaneously.

7. The system as recited in claim 6 wherein the positioning device includes a hinged holding device configured for simultaneously swinging a respective light source of the at least one light source in front of a respective lens of each of the two video cameras.

8. The system as recited in claim 6 wherein the at least one light source includes a light-emitting diode.

\* \* \* \* \*